United States Patent
Mulet Martinez (10) Patent No.: US 9,022,750 B2
(45) Date of Patent: May 5, 2015

(54) ALTERNATIVE METHODS TO GENERATE HIGH PRESSURE BY ITERATION IN A HIGH-PRESSURE MULTICHAMBER

(71) Applicant: Mauricio Eduardo Mulet Martinez, Vallenar (CL)

(72) Inventor: Mauricio Eduardo Mulet Martinez, Vallenar (CL)

( * ) Notice: Subject to any disclaimer, the term of this patent is extended or adjusted under 35 U.S.C. 154(b) by 15 days.

(21) Appl. No.: 13/729,699

(22) Filed: Dec. 28, 2012

(65) Prior Publication Data

US 2013/0121862 A1 May 16, 2013

Related U.S. Application Data

(63) Continuation of application No. 12/411,299, filed on Mar. 25, 2009, now abandoned, which is a continuation of application No. 11/564,435, filed on Nov. 29, 2006, now abandoned.

(51) Int. Cl.

| | |
|---|---|
| *F04B 17/00* | (2006.01) |
| *F04B 35/00* | (2006.01) |
| *F04B 1/02* | (2006.01) |
| *B01J 3/06* | (2006.01) |
| *B30B 11/00* | (2006.01) |
| *F04B 3/00* | (2006.01) |

(Continued)

(52) U.S. Cl.
CPC . *F04B 1/02* (2013.01); *B01J 3/065* (2013.01); *B01J 3/067* (2013.01); *B30B 11/004* (2013.01); *F04B 3/00* (2013.01); *F04B 25/00* (2013.01); *F04B 37/12* (2013.01); *B01J 2203/0655* (2013.01); *B01J 2203/068* (2013.01); *B01J 2203/0685* (2013.01)

(58) Field of Classification Search
USPC ............. 417/225, 244, 268, 227, 226, 521, 2; 60/416, 417
See application file for complete search history.

(56) References Cited

U.S. PATENT DOCUMENTS 2,544,414 A   3/1951   Bridgman et al.
3,191,383 A   6/1965   Basset
(Continued)

FOREIGN PATENT DOCUMENTS

EP    1795334    6/2007

OTHER PUBLICATIONS

Hall, H. Tracy, Chapter II: High Pressure Techniques; 1980; Section 3: Piston Cylinder Devices; pp. 1-33.

*Primary Examiner* — Devon Kramer
*Assistant Examiner* — Amene Bayou
(74) *Attorney, Agent, or Firm* — Hasse & Nesbitt LLC; Daniel F. Nesbitt (57) ABSTRACT

A multichamber pressure-increasing device is comprised of a plurality of chambers disposed in series one inside the other, wherein the innermost chamber is configured so as to place objects or samples therein to subject them to ultra-high pressures. An external hydraulic pump pumps fluid into the outermost chamber while a plurality of elemental hydraulic motor pump systems (EHMPS) are mounted in each chamber for increasing the pressure from one chamber to the next one disposed more to the interior of the device through an iterative process, each EHMPS consisting of two cylinder-piston assemblies operatively joined together in such a way that both pistons extend or retract simultaneously within their respective cylinders, the motor part driving the pump part as pressurized fluid admitted into the motor cylinder is subsequently discharged so fluid admitted into the pumping part cylinder is compressed therein and impelled at a higher pressure into the succeeding chamber.

6 Claims, 6 Drawing Sheets

(51) Int. Cl.
 *F04B 25/00* (2006.01)
 *F04B 37/12* (2006.01)

(56) References Cited

U.S. PATENT DOCUMENTS

| | | | |
|---|---|---|---|
| 3,379,043 A * | 4/1968 | Fuchs | 72/56 |
| 3,635,616 A | 1/1972 | Venkatesan | |
| 3,690,805 A | 9/1972 | Kopicko | |
| 3,740,169 A | 6/1973 | Papen | |
| 4,334,833 A * | 6/1982 | Gozzi | 417/258 |
| 4,460,323 A * | 7/1984 | Toplicescu | 425/77 |
| 5,094,595 A | 3/1992 | Labrador | |
| 5,863,186 A | 1/1999 | Green et al. | |
| 5,993,170 A | 11/1999 | Stevens et al. | |
| 6,079,956 A | 6/2000 | Maliszewski | |
| 2003/0118459 A1 * | 6/2003 | Gerhardt et al. | 417/390 |

* cited by examiner

ALTERNATIVE METHODS TO GENERATE HIGH PRESSURE BY ITERATION IN A HIGH-PRESSURE MULTICHAMBER

CROSS-REFERENCE TO RELATED APPLICATIONS

This application is a continuation application of U.S. Ser. No. 12/411,299, filed on Mar. 25, 2009 (now abandoned), which is a continuation application of U.S. Ser. No. 11/564,435, filed Nov. 29, 2006 (abandoned), the disclosure of which are incorporated herein by reference.

BACKGROUND OF THE INVENTION

The state of the art for obtaining ultra-high pressures within a defined volume includes the "diamond anvil cell technique" which uses ultra or extreme high pressure at an experimental level, since the generated extreme high pressures condition reaches only a very small volume, as it is achieved by storing the sample between two diamonds, one on top and the other on the bottom, surrounded by a sheet. This is experimentally used to study semi-conductors, superconductors and the variety of characteristics presented by different material under extreme pressure conditions, and it is also used to simulate the pressure conditions different materials are subject to in the crust of the Earth, and also it is used in the manufacture of powdered diamond, etc.

The manufacture of sintered components must also be mentioned within the range of applications of devices that produce ultra-high pressure. The material which makes up the component is in a ground form, and can be made of different compositions which are mixed, then they are placed in elements which act as molds and the ground material is subject to pressure, causing the particles to bond. This has the inconvenience that sintered components made of steel result in porous components, reducing their resistance, as they have a serious limitation to high pressure. High pressure is better used with polymeric material for the manufacture of components which are not subject to high traction forces.

SUMMARY OF THE INVENTION

In the present invention ultra-high pressure is obtained within a defined volume by iterating a plurality of elemental hydraulic motor pump systems, wherein each one of the a plurality of elemental hydraulic motor pump systems is placed inside a corresponding one of a plurality of chambers which are disposed in series one inside the other, the chambers so interconnected therebetween that fluid can pass from one chamber to the other that is directly internal to said chamber, and vice versa, and through said iteration process achieve increasingly high pressure from a preceding, more external chamber to a succeeding, more internal chamber until the desired ultrahigh pressure is obtained in the innermost chamber.

A multichamber pressure increasing device as this one, which produces ultra-high pressures within a defined volume, can be used to manufacture ultra-high pressure sintered material components, manufacture components from new materials like synthetic diamond, manufacture material for pharmaceutical products and to produce hydrowashers using this new technique to increase its pressure.

According to one aspect of the invention, a multichamber device is provided for producing ultra-high pressures within a defined volume that comprises an elemental hydraulic motor pump system mounted in each chamber, the elemental hydraulic motor pump systems consisting of two cylinder-piston assemblies that form the motor (or propelling) part and the pumping part of the elemental hydraulic motor pump system, wherein the two cylinder-piston assemblies are operatively joined together in such a way that both pistons extend or retract simultaneously within the respective cylinders, wherein the chambers are disposed in series one inside the other as concentric chambers, wherein the chambers are so interconnected therebetween that fluid can pass from a preceding chamber to a succeeding chamber, and vice versa, and through an iterative process the elemental hydraulic motor pump systems can increase the pressure from a preceding chamber to a succeeding chamber until reaching an ultra-high pressure in the innermost chamber. The motor part of the elemental hydraulic motor pump systems in any of the chambers actuates with the fluid pumped from the hydraulic motor pump system of the chamber preceding it, or from an external hydraulic pump if the elemental hydraulic motor pump system is the first one mounted in the first, or outermost, chamber, the motor part piston retracting inside the motor cylinder when it admits fluid, and subsequently extending inside the motor cylinder when said fluid is discharged to the previous chamber or, in the case of the first or outermost chamber, to the outside environment at nil pressure, the fluid in the motor part cylinder thus passing from a high pressure environment to a low pressure environment, the motor part thereby actuating the pumping part as the energy expended by said fluid discharged from the motor part is transferred to fluid which is admitted into the pumping part from within the chamber simultaneously with the admission of fluid into the motor part, the pumping part subsequently compressing said fluid admitted thereinto and impelling it at a higher pressure into the succeeding chamber, i.e. the next chamber which is disposed more towards the inner part of the multichamber device, said compressing and impelling of the fluid within the pumping part realized at the same time said discharge of fluid from the motor part takes place. The device can comprise double-compartment chambers or triple-compartment chambers with one compartment being cylindrical and the other spherical in a way that the elemental hydraulic motor pump systems are only placed inside the cylindrical compartments section, while the other compartments, i.e. the ones having spherical compartments, are left empty in order to install inside objects or samples to be submitted to high pressure within the innermost chamber.

According to another aspect of the invention when fluid is admitted into any chamber coming from the pumping part of the elemental hydraulic motor pump system of the preceding chamber or, in the case of the first, outermost chamber, from an external hydraulic pump, it is guided through a fluid incoming tube toward the motor part of the elemental hydraulic motor pump system but it does not enter the motor part until the pressure has been first increased to a value higher than Pi, this being a predetermined value which is detected by a pressure differential sensor which actuates a motor intake valve, opening it while a motor outlet valve is closed so that once the motor part is filled up with pressurized fluid, it is then detected by a sensing device of the extension level of the motor piston within the motor cylinder, which closes the intake or admission valve of the motor part and opens the motor outlet valve, and as a result of this the fluid in the motor part starts to unload towards the previous chamber, or towards the outside environment if the chamber in question is the first, outermost chamber; whereas the pumping parts of the elemental hydraulic motor pump systems comprise two simple retention valves, one which is located at the fluid admission or intake port of the pumping part and another one which is located at the fluid outlet port of the pumping part, said fluid outlet port of the pumping part being connected with the incoming tube of the succeeding chamber.

According to yet another aspect of the invention, when fluid is admitted into any chamber coming from the pumping part of the elemental hydraulic motor pump system of the preceding chamber or, if the chamber in question is the first, outermost chamber, from an external pump, said fluid is discharged inside the chamber through a fluid intake port of the chamber, thereby increasing the pressure in the chamber until after several pumping stages are performed and the pressure exceeds a level Pi, which is a predetermined value. Said pressure Pi is detected by a pressure differential sensor which actuates a motor intake valve, closing it, and actuates a motor outlet valve, opening it, causing the motor part of the elemental hydraulic motor pump system to start to empty and when this point is reached a piston's extension sensing device detects it and it closes the motor outlet valve and opens the motor intake valve, and the elemental hydraulic motor pump system's cylinders are then dragged away from each other by a spring which is installed between the motor part and the pumping part and which therefore retracts the pistons within the cylinders; whereas the pumping parts of the elemental hydraulic motor pump systems comprise two simple retention valves, one which is located in the fluid admission or intake port of the pumping part and another one which is located at the fluid outlet port of the pumping part, said fluid outlet port of the pumping part being connected with the inside of the succeeding chamber through a pipe extending to the fluid intake port of said succeeding chamber.

DETAILED DESCRIPTION OF THE INVENTION

A separate presentation will be made for
1. Concentric chambers to resist ultrahigh pressure.
2. Method for the generation of high pressure by iterating elemental hydraulic motor pumps within a multichamber device.
3. Alternative method for generating high pressure by iterating elemental hydraulic motor pumps within a multichamber device.
4. Double concentric chambers.

Concentric Chambers to Resist Ultrahigh Pressure.

An intuitive example will be given first, in order to demonstrate that a steel chamber within a another chamber in a series of concentric chambers one inside the other can resist much more pressure than the maximum tensile stress resisted by steel.

The example to consider is the behaviour of a balloon placed inside another balloon and the latter placed inside yet another balloon and so on. A first balloon is provided which is inflated up to 3 liters. The balloon's pressure under this condition is 2.0 psi. If it is inflated further it can burst, assuming that is, that its resistance is 2.5 psi. Now, if the pressure is increased to 2.0 psi in the environment where the balloon is placed, the balloon will reduce its size.

Accordingly, more air can be filled into the balloon so that it can return to the initial three liters. Again, if in the existing environment the pressure is increased by another 2.0 psi, the size of the balloon is again reduced. This allows more air to be filled into the balloon so that it returns to the initial 3 lts. This operation can be repeated until reaching a state where the balloon ends up resisting 50.0 psi while having a volume of 3 liters and the existing environment is under a pressure of 48 psi.

If a second balloon is provided, and the first balloon is placed inside this second balloon, the "external" balloon can be inflated so that the pressure inside reaches 48 psi, at an outside environment pressure of 46.0 psi, since the inserted balloon can be inflated with 2.0 psi more pressure than the "external" balloon, i.e. 50 psi. Following this scheme, a third balloon can be provided external to said second balloon and also inflated, and then another one can be provided external to this third balloon and also inflated, until reaching a condition where, finally, at an environment at atmospheric pressure, a first or "external" balloon is provided at a pressure of 2.0 psi and inside there is another balloon inflated up to an additional 2.0 psi, i.e. 4.0 psi, and another balloon is inside of the latter and inflated with additional 2.0 psi, i.e. 6.0 psi, and yet another balloon is inside this latter one and inflated at 2.0 psi more, and so on until finally having a last, innermost balloon with 50 psi of pressure.

In summary with this example it has been demonstrated that a balloon under atmospheric conditions does not resist 50 psi, since its resistance is defined as 2.5 psi, but it does resist said pressure of 50 psi when given the protection of a series of other balloons placed one inside the other, each resisting 2.5 psi.

If instead of balloons these were steel vessels or chambers, then, as a result of an arrangement of 20 or 30 of these chambers disposed in series one inside the other, a pressure of up to 30,000 kg/cm² or even more can be resisted by the innermost vessel or chamber.

Figure 1:
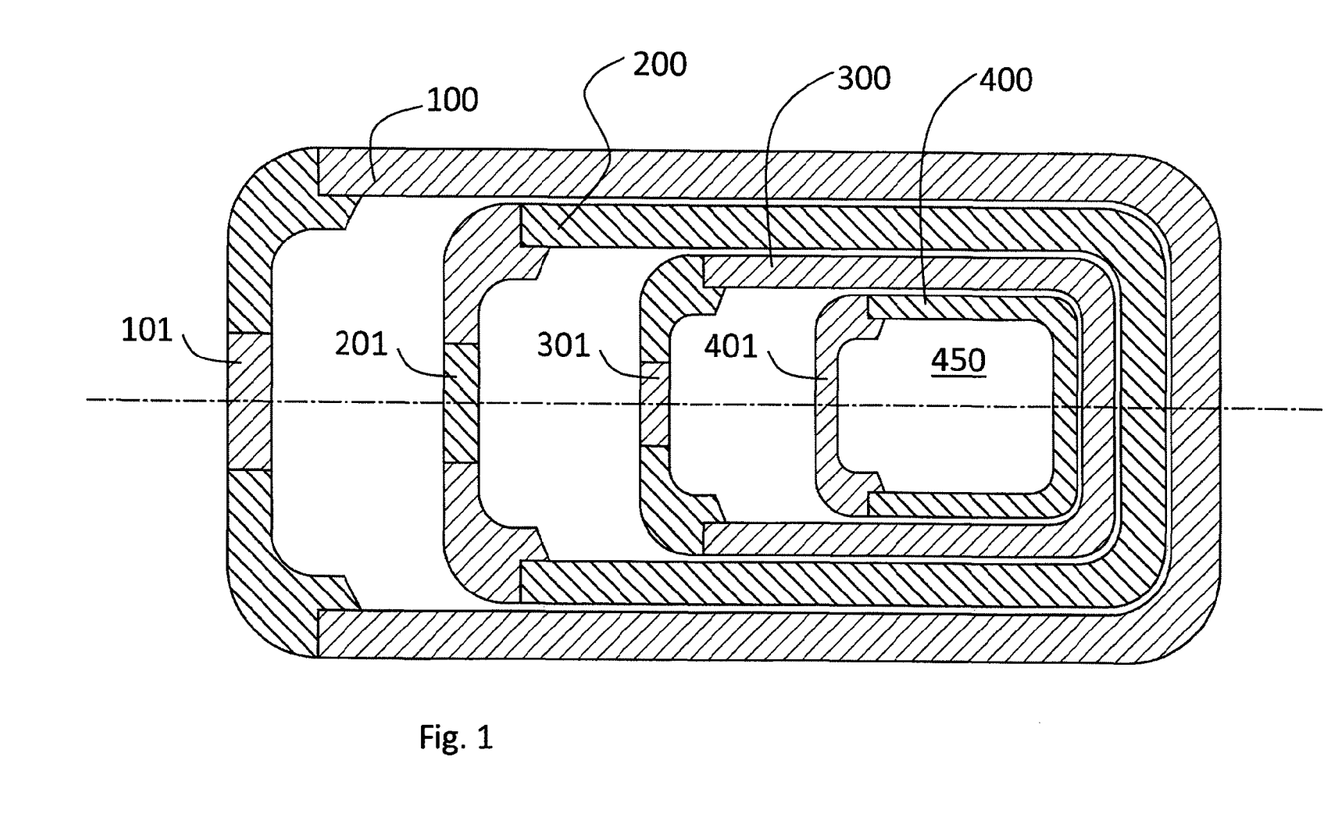
FIG. 1 schematically shows a lengthwise cross-section view of a cylindrically-shaped multichamber device for producing ultra-high pressures within a defined volume according to the invention that, for illustrative purposes, does not include the pressure-increasing arrangement of the present invention.

FIG. 1 illustrates the multichamber device of the invention without showing the pressure-increasing arrangement comprised of an elemental hydraulic motor pump system in each chamber. It corresponds to a simple multichamber device, i.e. a device comprised of one chamber inside another one, inside another one and so on, successively. The chambers can have small holes or gaps (not shown).

Figure 6:
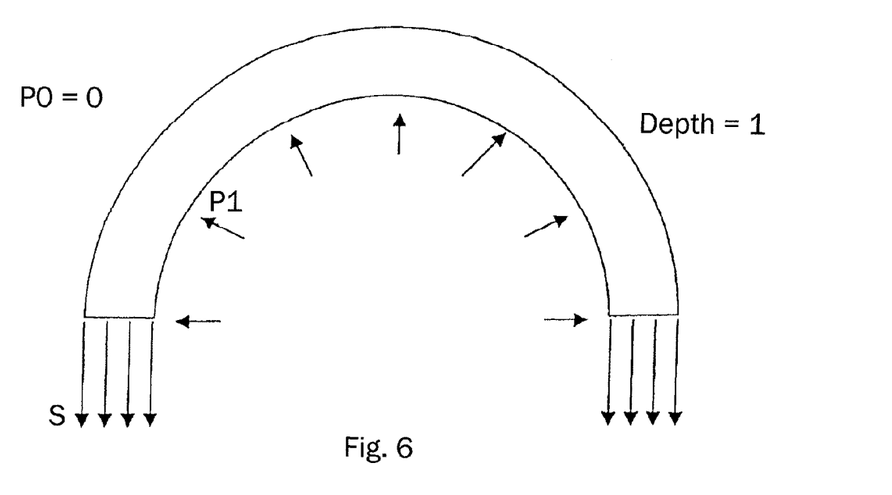
FIG. 6 shows a partial transverse cross-section view of a first cylindrically-shaped chamber of the multichamber pressure increasing device as shown in FIG. 1, illustrating the applied forces.
Figure 7:
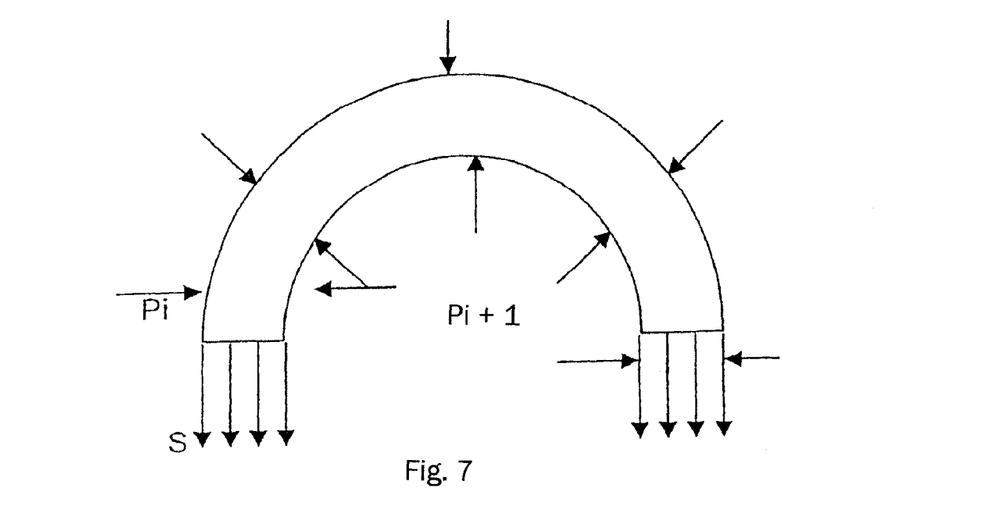
FIG. 7 shows a partial transverse cross-section view of a second cylindrically-shaped chamber of the multichamber pressure increasing device as shown in FIG. 1, disposed within the first cylindrically-shaped chamber as shown in FIG. 6, and illustrating the applied forces.

In FIGS. 6 and 7, partial cross-section views are provided of two individual vessels or chambers of cylindrical shape, as those shown in FIG. 1, with semi-spherical bottoms or ends. It shall be noted that, if the chambers were spherical instead of cylindrical, they would resist a higher pressure. The external diameter of the second chamber (FIG. 7) is slightly smaller than the internal diameter of the first chamber (FIG. 6), which is arranged directly towards the outside of the second chamber, so that the second chamber can be mounted thereon.

In the example of these figures, tensile stress and pressure forces are illustrated with arrows, and the width or depth of the cylindrical chambers is unitary. The material is steel, its tensile strength S being 3,000 kg/cm², and the thickness of the walls is 1/10 of the diameter of the cylinder or less.

In the first chamber shown in FIG. 6:
P0: External pressure equal to nil
P1: Pressure resisted by the first chamber
D1: External diameter
S: Wall tensile stress To obtain the pressure P1 in chamber 1 we proceed as follows:

$$P1 \times 0.8 \times D1 = P0 \times D1 + 2 \times S \times 0.1 \times D1; \text{ and since } P0=0,$$
then $$P1 = 0.25 \times S$$

Chamber 2, which is arranged inside chamber 1, is shown in FIG. 7 and has an external diameter D2 which is slightly smaller than the internal diameter of chamber 1. However, for calculation purposes these diameters will be considered as having similar size.

The pressure P2 in the second chamber is then:

$$P2 \times 0.8 \times D2 = P1 \times D2 + S \times 0.2 \times D2$$

$$P2 = 0.25/0.8 \times S + 0.25 \times S; P2 = 0.5625 \times S$$

Pressure P2 has been obtained with a cylinder-piston assembly arranged inside chamber 1. The reason why the pressure can be increased from chamber 1 to chamber 2 will not be demonstrated herewith. The aim of this example is to observe the resistance of the chambers at high pressure. The only parameter to be considered is that the pressure that can be generated with two cylinder-piston assemblies as the ones of the invention, disposed inside any chamber, is limited to a maximum of 0.8×S, plus the pressure in the chamber.

Also, if we consider a third chamber that is arranged inside chamber 2, the internal diameter of chamber 2 is slightly larger than the external diameter of chamber 3. However, for calculation purposes these diameters will be considered as having similar size. Then, the pressure P3 in chamber 3 is calculated as follows:

$$P3 \times 0.8 \times D3 = 0.5625 \times S \times D3 + S \times 0.2 \times D3$$

$$P3 = 0.5625/0.8 \times S + 0.25 \times S; P3 = 0.953 \times S$$

In the same way we have that the pressure in subsequent chambers, one inside the other, is as follows:

$$P4 = 1.44 \times S \text{ with } D4 = 0.8^{**}3 \times D1$$

$$P5 = 2.05 \times S \text{ with } D5 = 0.8^{**}4 \times D1$$

$$P6 = 2.81 \times S \text{ with } D6 = 0.8^{**}5 \times D1$$

Using the same methodology we have: P7=3.77×S.

The difference in pressure with the preceding chamber is in this case 0.96×S, which is higher than 0.8×S indicated as the limit value. Accordingly, the subsequent chambers will present a pressure difference equal to 0.8×S and therefore to optimize the size of the multichamber system the thickness of the walls of the chamber should be adjusted. This thickness should be reduced until the stress of the walls is similar to that of the other's, i.e., similar to S. If this provision is followed, and the thickness of the walls of the chamber are not adjusted but kept-equal to 0.1×D, they would remain with a stress lower than S, and the internal diameter in this case would be reduced unnecessarily.

Therefore, under an optimal configuration:

$$P7 = 3.61 \times S$$

$$P8 = 4.41 \times S$$

$$\ldots$$

$$Pn = (4.41 + (n-8) \times 0.8) \times S$$

If n=20 we have that P20=13×S=39,000 kg/cm², which exceeds the tensile strength of steel. Therefore it has been demonstrated that a steel chamber easily resists a pressure which is much higher than the tensile stress which the steel itself resists, provided said chamber is enclosed inside another chamber, and the latter chamber is also enclosed in yet another chamber and so on, until reaching a last, outermost chamber which resists "normal pressures".

Method for the Generation of High Pressure by Iteration of Elemental Hydraulic Motor Pumps within a Multichamber Device.

Hereinafter methods will now be described which can generate pressure, over pressure, over pressure and so on by iteration of elemental hydraulic motor pumps disposed within a multichamber device.

Figure 2:
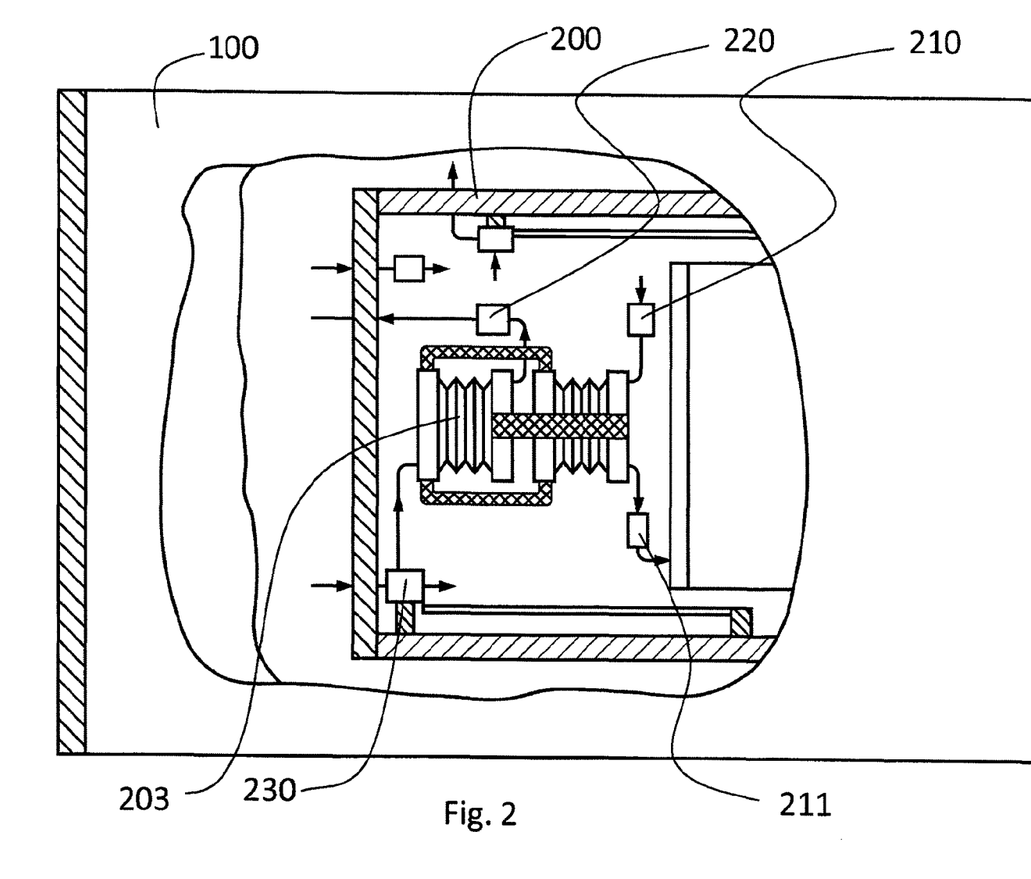
FIG. 2 shows a partial lengthwise view of a multichamber pressure increasing device similar to the one of FIG. 1, with a cut-out window showing in cross-section view one of the chambers with an elemental hydraulic motor pump system inside consisting of two interconnected bellows.

In FIG. 2 a multichamber device according to the invention is shown where the hydraulic motor pump systems consist of interconnected bellows. It is a schematic drawing in order to illustrate the motor pumps inside the chambers.

FIG. 2 and FIG. 1 illustrate the chambers of the invention wherein there is a multichamber device and between each pair of consecutive chambers there is pressure increase and fluid pumping means.

Figure 3:
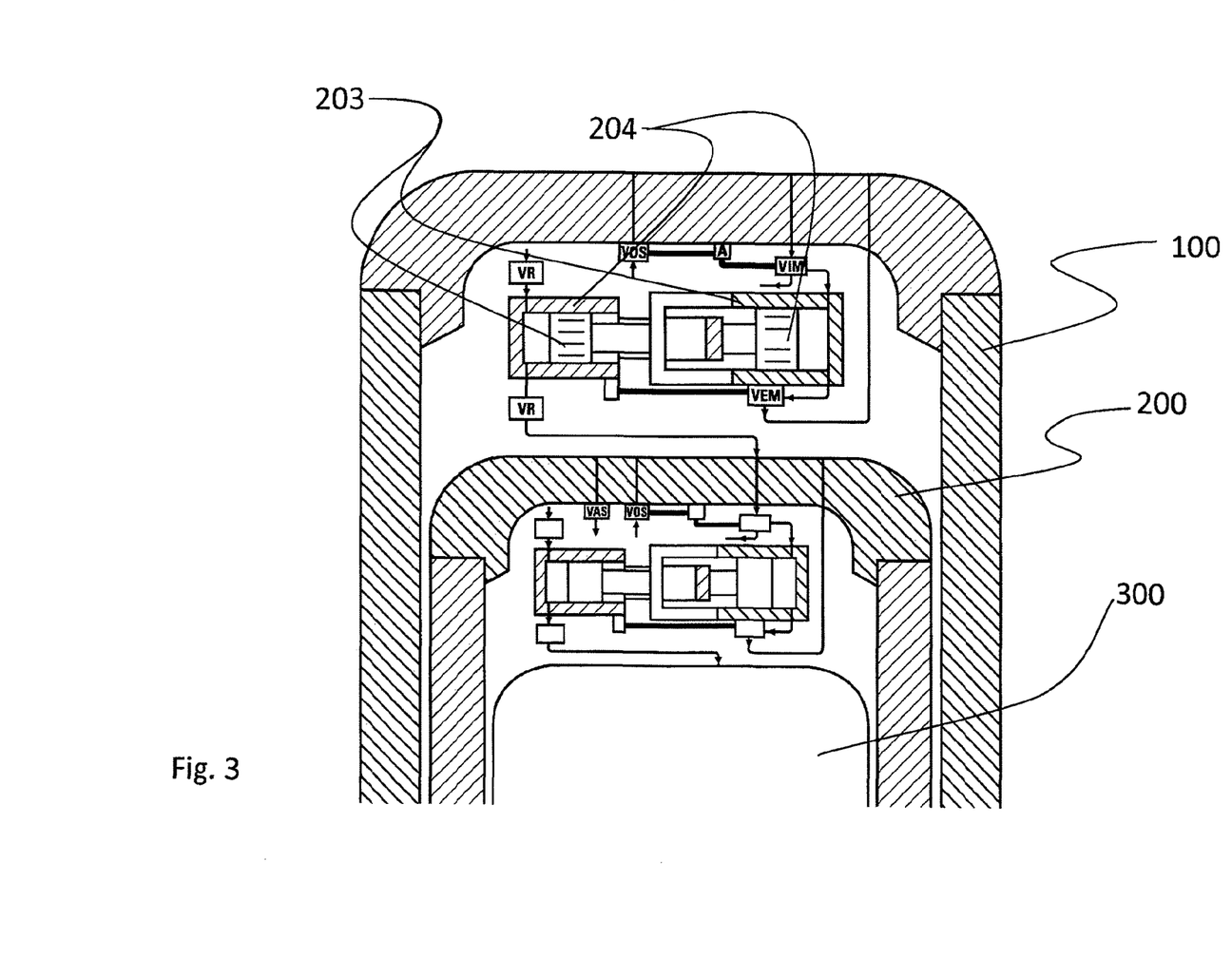
FIG. 3 shows a partial view of the multichamber pressure increasing device of FIG. 1, having a pressure increasing arrangement consisting of an elemental hydraulic motor pump system comprised of two cylinder-piston assemblies placed inside each of the chambers.

In FIG. 3 a more realistic multichamber device is shown, where the hydraulic motor pump systems are comprised of cylinder piston assemblies which are interconnected in an analogous manner to the bellows of FIG. 2.

FIG. 3 shows a multichamber device which includes a preferred embodiment of the pressure increasing system of the invention in each one of the chambers.

Obtaining high pressure via elemental hydraulic motor pumps mounted inside a plurality of chambers which are disposed in series one inside the other, is a new concept, by which a predefined pressure can be obtained in each chamber by means of an iterative process. Given a predefined pressure P1 of a fluid contained in a first, outermost chamber or vessel 100, where said pressure can be obtained with an external pump, the invention generates conditions so that in the environment under pressure P1, by using an elemental hydraulic motor-pump system that consists of a "motor" or propelling part and a "pumping" part, pressures are obtained in the pumping part which are higher than P1 and the pressurized fluid is then stored in a second chamber or vessel 200 located in the inside of chamber 100. When chamber 200 has reached a predetermined pressure level P2, after several iterations with the "motor" and "pumping" parts or assemblies of chamber 100, the operation is repeated using a second set of "motor" and "pumping" assemblies which are intended to fill with pressurized fluid a third chamber 300 placed inside chamber 200. The operation is repeated as many times as required. It shall be noted that an arrangement where a chamber is inside another chamber, and the latter is inside another chamber and so on, can resist very high pressures, without being restricted by the resistance of the material with which the chambers are made.

In more detail, with reference to FIG. 3, an external pump (not shown) consisting of a cylinder and piston assembly takes a fluid under atmospheric pressure and pumps it into a first, outermost closed vessel or chamber 100, which contains other smaller consecutive chambers 200 and 300 in its inside, each chamber having mounted therein hydraulic motor pump systems, valves, etc. In the embodiment of FIG. 3, the hydraulic motor-pump systems consist of two cylinder-piston assemblies 203 and 204 that form a motor or propelling assembly and a pumping assembly, wherein the propelling cylinder is rigidly joined to the pumping piston, this arrangement defining cylinder-piston assembly 204, and the pumping cylinder is rigidly joined to the propelling piston, this arrangement defining cylinder-piston assembly 203. When entering chamber 100, the fluid passes through an admission valve, VIM (motor intake valve), which is connected to the propelling part of the hydraulic motor-pump system. When the pressure P is less or the same as a predetermined pressure P1, the fluid coming in from the external pump only flows into the inside of the first chamber, to the space outside of the cylinder pistons of the hydraulic motor-pump system of chamber 100; and when the pressure is higher than P1, the liquid flows into chamber 100, and into the inside of the hydraulic motor-pump system of chamber 100.

In the beginning there is no pressure in chamber 100 so P is smaller than P1 and the fluid flows into chamber 100, passing through the motor intake valve VIM, but not yet into the hydraulic motor-pump system of chamber 100. However, after several pumping steps the pressure in chamber 100 exceeds P1 and the fluid then flows into the motor or propelling assembly of the hydraulic motor-pump system of chamber 100, because the motor intake valve VIM opens by the actuation of a differential pressure sensor A. When the propelling assembly's piston starts to retract, that is, when the propelling piston starts to move away from the blind or closed working end of the propelling cylinder towards its retracted position because of the fluid flowing from the external pump into the propelling cylinder, so does the piston of the pumping assembly, since the same is rigidly joined to the motor or propelling piston's rod and the propelling assembly actuates the pumping assembly. When the pumping assembly piston retracts, it takes in fluid from chamber 100 through a retention valve VR.

When in chamber 100 or in any other chamber the cylinder-piston assemblies have filled up with fluid at the same pressure as the fluid within the chamber, having the propelling cylinder-piston assembly taken in pressurized fluid from the pump outside the chamber in the case of chamber 100 or, if this was any of the other more internal chambers, from the hydraulic motor pump system arranged in the chamber directly preceding it, and having the pumping cylinder-piston assembly taken in fluid from the chamber in which it is mounted in, the propelling assembly must then unload, so the propelling cylinder-piston assembly has an evacuation valve or motor outlet valve, VEM, which opens when the propelling cylinder is filled up with fluid and it unloads the fluid towards a lower pressure environment, that is, to the outside environment at a nil pressure if the chamber in question is chamber 100, or towards the directly preceding chamber if the chamber in question was any of the other more internal chambers. The motor outlet valve VEM is actuated with the separation distance between the two pistons, so that when said separation reaches a maximum value it closes and when it reaches a minimum value it opens.

The pumping assembly of chamber 100 is now in a condition to pump the fluid contained therein at a higher pressure than P1. Indeed, when the motor outlet valve VEM opens and fluid starts to unload from the propelling assembly, the pumping assembly piston is again actuated by the propelling assembly cylinder. Specifically, as the propelling piston extends or moves relative to the propelling cylinder towards the closed working end of the propelling cylinder, i.e. towards the propelling piston's expanded position, the pumping piston moves in the same way within the pumping cylinder.

The pressurized fluid pumped by the pumping assembly of chamber 1 is conveyed to chamber 200. When the pressure of said fluid is lower than P2, which is another preestablished value, it is not enough to actuate the intake valve of chamber 200 and to flow into the elemental hydraulic motor pump system mounted in this chamber, and for this reason the whole process does not continue any further but waiting for further pressurization of chamber 200.

In this respect, going back to chamber 100, we have that the pressure in the chamber was reduced to a value slightly under P1 after pressurized fluid was admitted into the propelling and pumping assembly and it was subsequently unloaded from both assemblies, the propelling assembly having unloaded towards the outside of the chamber, at nil pressure, and the pumping assembly having unloaded into chamber 200. In this way, another pumping of fluid is performed by the external pump so the pressure is increased in chamber 100 but remains slightly under P1. By means of additional pumping stages in this way pressure P1 is reached and then, once exceeded, fluid is again pumped into the inside of the propelling cylinder of chamber 100 so that, through the process already described, the pumping assembly of chamber 100 performs another pumping of fluid from chamber 100 in this stage which passes to chamber 200.

After repeating said process as many times as necessary, a pressure P1 will be attained in chamber 100 and a pressure P2 will be attained in chamber 200. An additional pumping of fluid will then allow the pressurized fluid to enter chamber 300, which is arranged inside of chamber 200, and the sequence described before for chamber 200 is repeated as many times as needed to reach the predetermined pressures in chamber 200 and in chamber 100, and until reaching a pressure level P3, which is another predetermined value, in chamber 300.

Operating in this way, with the rest of the chambers, the elemental hydraulic motor pump systems and valves of the multichamber device of the invention increases the pressure from chamber to chamber, until completing the process at an innermost chamber n, where a pressure level Pn is obtained. With chambers made of suitable material, and with the hydraulic motor pumps set up in this way, a Pn value can be reached, which is sufficiently high for the desired manufacturing or testing application, as for example 20,000 or 50,000 kg/cm² or even more.

After submitting a component or sample to high pressure it is necessary to remove the pressure. The device has a lid and on the lid there is a relief valve so that when it is operated no manipulation can be done on the lid without first relieving the pressure from the chamber. With this relief valve the pressure in the chambers is relieved such that the more external ones are first relieved of pressure through the safety valves and then the more internal chambers start to be relieved of the pressure. This order in the pressure relief process is because when a given chamber is relieved of pressure the relative pressure in the chamber that is further inside the device tends to increase and for this reason it starts to automatically empty of fluid. An electrical system can be designed, which can be operated from the outside to control the above-mentioned pressure relief process.

The following is the equipment:

Motor intake valve VIM: this valve operates in any chamber acting as an intake valve for the pressurized fluid coming in from the pumping assembly of the previous chamber (or directly from the outside of the multichamber device if the chamber in question is the first, outermost chamber). It discharges the fluid inside the chamber, i.e. outside of the propelling cylinder assembly, if the pressure is lower than the pre-established value, or else it discharges the fluid inside the motor or propelling cylinder if the pressure is the same or higher to the pre-established value. This valve operates by means of a sensor that captures the pressure difference between the chamber and the preceding or more external chamber, and it is adjusted so that the fluid is guided into the motor or propelling cylinder if the pre-established value is exceeded.

Pressure differential sensor A: This sensor operates with the deformation undergone by the walls of the chamber when pressurized fluid is admitted into the chamber. The higher the pressure, the bigger the deformation will be. The pressure differential sensor, consists basically of a long rod which is arranged inside the chamber with an end fixed to the chamber wall and has a free end at the other side.

Due to the pressure difference between the chamber and the outside thereof, the chamber is deformed displacing the free end of the pressure differential sensor and actuating in this way the motor inlet valve VIM which is fixed to the edge of the chamber.

Motor outlet valve VEM: this valve allows to unload the fluid from the motor assembly of the hydraulic motor pump system. When the cylinder reaches its maximum level of extension, it reaches a stop on an external cylinder rod and a sensing device senses this and actuates the valve allowing to discharge the fluid from the motor assembly towards the preceding chamber or, if the chamber in question is the first stage or chamber, to the outside of the multichamber device. When a minimum level of extension is reached by the cylinder, i.e. when the cylinder is in the retracted position, there is another stop on the external rod which the sensing device detects and it closes the motor outlet valve allowing again the pressurized fluid from the chamber to fill up the propelling cylinder.

Discharge valve or safety valve VDS: this valve is actuated only if the pressure differential sensor between the chamber and the preceding chamber senses a deformation of the chamber walls that is of an important level. A thin rod is placed inside the chamber, such that its free end reaches the chamber wall, whereas the other end controls a retention valve which is affixed to the chamber, but this arrangement will only work if the deformation of the chamber's walls is of an important enough level.

Simple retention valve VR: it is a valve that allows the fluid to flow only in one direction. There are simple retention valves VR arranged where the fluid is admitted into the pumping assembly of the hydraulic motor system and where it is subsequently unloaded from the pumping assembly and impelled to the succeeding, more internal chamber, so that it never allows more pressure in the chamber which is directly preceding or more to the outside of the multichamber device than in the chamber in question.

Elemental hydraulic motor pump system: it is comprised of two cylinder-piston assemblies, that form a motor or propelling assembly and a pumping assembly, wherein the pistons and cylinders are operatively joined in such a way that when one piston moves in its cylinder in one direction relative to its disposition in the cylinder, the other piston also has to move inside its cylinder in the same relative direction. There is an elemental hydraulic motor pump system in each chamber.

External cylinder rod: this is a rod which is mounted on one end to the cylinder of the pumping assembly of the elemental hydraulic motor pump system and has motor cylinder extension stops on the other end, wherein a sensing device detects when the motor cylinder reaches these stops to activate or deactivate the motor outlet valve VEM.

Alternative Methods to Generating High Pressure by Iteration.

There are alternative methods to increase the pressure by iteration. One of these alternative methods is described hereinafter with reference to FIG. 4.

Figure 4:
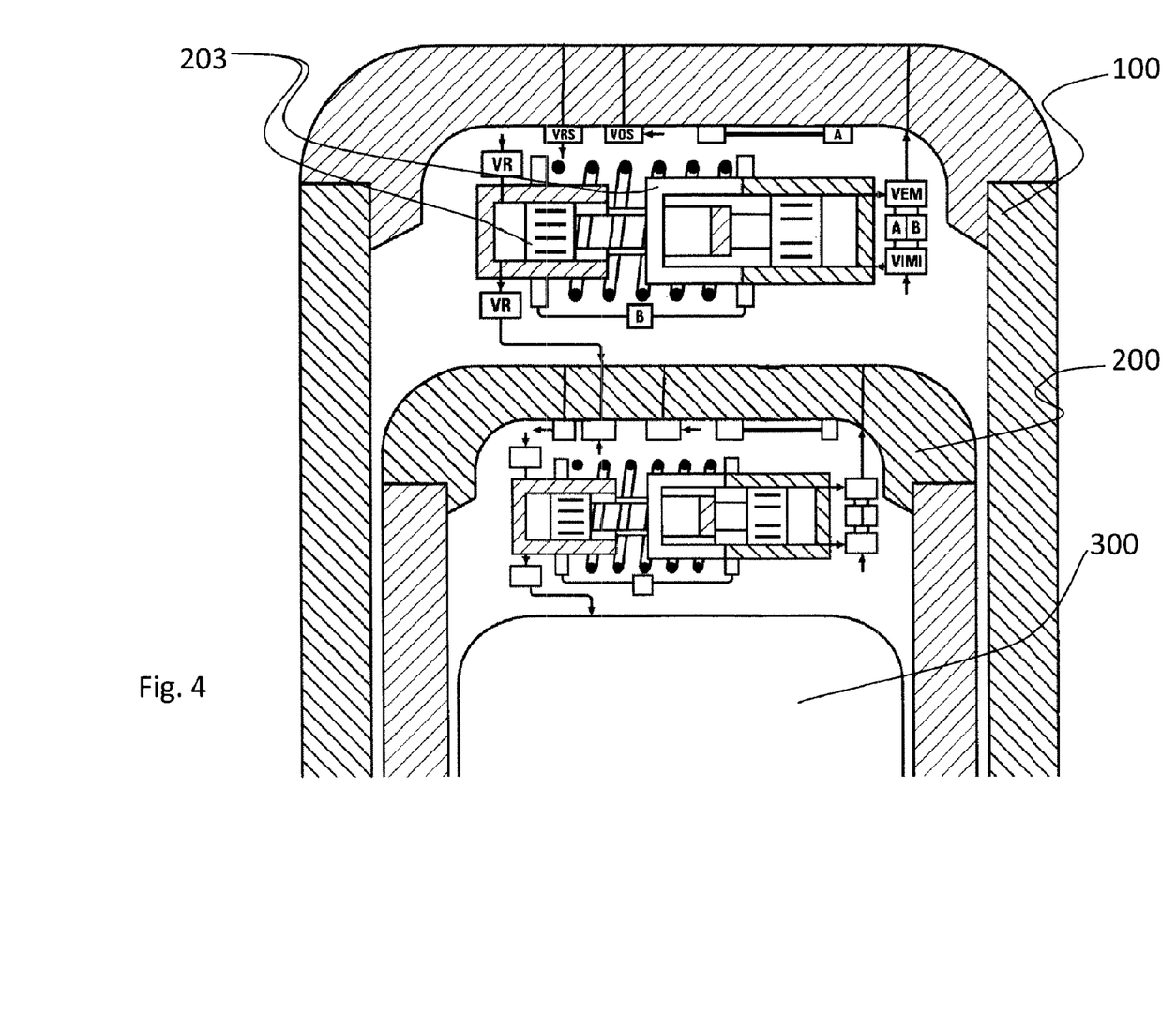
FIG. 4 shows a partial view of an alternative embodiment of the multichamber pressure increasing device of FIG. 1, wherein the pressure increasing arrangement consists of elemental hydraulic motor pump systems comprising two cylinder-piston assemblies placed in each of the chambers, wherein each elemental hydraulic motor pump system comprises a spring mounted between the cylinders and wherein the motor or propelling assemblies are not connected to the chamber's fluid inlet tube.

FIG. 4, which is similar to FIG. 3, shows a multichamber device which has a fluid admission into the chamber which is disconnected from the cylinder of the propelling assembly. The multichamber device further comprises a precompressed spring to move away from each other the cylinders of the cylinder-piston assemblies of the hydraulic motor pump systems of each chamber thus causing the pistons to retract within the cylinders.

FIG. 4 shows a multichamber device with a pressure increasing arrangement inside each of the chambers. It shall be noted that each hydraulic motor pump system has its spring between the cylinders and that the fluid intake port of the motor assembly is not connected with the intake port of fluid into the chamber and fluid discharge pipe from the pumping assembly of the preceding chamber (or from the external pump if the chamber in question is the first one).

In the beginning of the pressure-increasing process the external pump is actuated, thus causing fluid to flow into chamber 100, which is the one arranged in the outermost part of the multichamber device, and it is the largest chamber which contains all the other chambers. The external pump fills chamber 100 with pressurized fluid up to a pressure P1, and continues delivering pressurized fluid to chamber 100 through successive pumping stages, but the pressure is not increased any further in this case since a pressure any higher than P1 will actuate also the hydraulic motor pump system of chamber 100, which is located within chamber 100. When actuated, the motor and pumping assemblies are fed in every pumping stage, with the fluid contained in chamber 100, and when both pistons have retracted up to maximum retraction level, they subsequently unload said fluid, the motor or propelling assembly unloading towards the outside of the chamber, and the pumping assembly unloading towards chamber 200, which is located further inside of the multichamber device. It shall be noted that the fluid admission or intake port of the motor assembly of the hydraulic motor pump system of chamber 100 is not connected to the incoming tube from the pump which is located outside of the multichamber device.

When the elemental hydraulic motor pump system of chamber 100 is actuated it is filled up with fluid, due to the cylinders of the motor and pumping assemblies moving away from each other (and thus the pistons retracting within the cylinders) by the restoring force, towards its natural position, of a spring which is compressed between the cylinder of the motor assembly and the cylinder of the pumping assembly. This movement of the cylinders of the hydraulic motor pump system of chamber 100 then stops when the pressure differential sensor A is activated, which opens the motor outlet valve VEM and closes the motor intake valve VIMI, or valve that controls the fluid admission into the motor assembly.

The pumping assembly then starts to empty and the motor assembly too, that is, the whole hydraulic motor pump system of chamber 100 starts to empty, up to a point where the outlet motor valve VEM closes. At the same time the VEM valve closes, the motor intake valve VIMI is actuated by a sensor of the motor-pump piston's extension B that is activated at the end of the displacement of the pistons and therefore the motor assembly, and also the pumping assembly begin to get filled up again with pressurized fluid, as now the moving apart of the cylinders, hence retraction of the pistons, of the motor and pumping assemblies is again performed by the spring disposed between the cylinders, and this starts to fill the motor and pumping assemblies with fluid until the pressure differential sensor actuates again.

The motor inlet valve VIMI is closed by effect of the pressure differential sensor's actuation and it is opened by the effect of an external cylinder rod having motor piston extension stops which are sensed by a sensor when the piston reaches one of these stops. The VEM opens according to the pressure differential sensor's actuation and it closes by the effect of the external cylinder rod and sensor.

As the elemental hydraulic motor pump system of chamber 1 starts to empty, the pressure in chamber 200 starts to increase. After several pumping steps a pressure level P2 is reached, which corresponds to another preestablished value, and as the motor inlet valve VIMI is activated the elemental hydraulic motor pump system of the chamber 200 starts to fill with pressurized fluid. In the same way, in the rest of the inner chambers the elemental hydraulic motor pumps are filled with the fluid which is inside the chamber when (after several pumping steps) a predetermined pressure differential is reached with the preceding chamber, and as the fluid in the elemental hydraulic motor pump system in a chamber is unloaded, the pressure in the following, more internal chamber increases.

The simple retention valve VRS at the fluid inlet port, the unloading valve and the safety valve existing in each chamber actuate by themselves when certain pressure requirements are fulfilled. Accordingly, when pressure increases in any chamber, fluid is also admitted into the chambers which are further to the inner part of the multichamber device, not being possible for a chamber which is further to the inner part of the multichamber device to have a lower pressure than the one preceding it.

A variant of construction of the pistons and cylinders is to have the two cylinders rigidly joined instead of the two pistons rigidly joined or, alternatively, the pistons of the motor assembly may be made rigidly joined to the cylinder of the pumping assembly and the cylinder of the motor assembly rigidly connected to the piston of the pumping assembly. Depending on which option is selected, the spring will always be either compressed or extended.

Equipment:

Motor-pump springs: The equipment of this other embodiment of the invention is almost the same as the one previously described, the only new element being the spring disposed between the motor assembly and the pumping assembly. This spring can be mounted in different ways according to the construction of the hydraulic motor pumps. This spring is located between the two cylinders of the hydraulic motor pump system, it extends or compresses in such a way as to keep the pistons in a retracted position and the cylinders in a filled-up-with-fluid state, if there is no other force acting on the hydraulic motor pump. Otherwise, if the hydraulic motor pump is to be maintained empty, the spring is to be in the natural precompressed position.

Motor inlet valve VIMI: this valve is actuated in order to be closed when the pressure differential sensor, which actuates with the pressure difference between the chamber and the preceding one, is activated.

Pressure differential sensor A: This sensor operates with the deformation that the walls of the chamber undergo when subject to pressure. The higher the pressure, the bigger the deformation will be. This pressure differential sensor consists basically of a long rod arranged inside the chamber which has one end fixed to the chamber's wall and the other end is free. Due to pressure difference between the chamber and the outside of chamber, the chamber is deformed displacing the free end of the pressure differential sensor and actuating in this way the motor intake valve VIMI which is located at the edge of the chamber.

Motor pump extension sensor B: In this case a device is provided that carries sensors of the piston's extension level provided by stops which are disposed on an external cylinder rod. When the pistons of the elemental hydraulic motor pump reach the extension stops at the end of their displacement, the motor pump extension sensor actuates to open the motor intake valve and close the motor outlet valve.

Motor outlet valve VEM: this valve allows the discharge of the fluid in the motor assembly of the hydraulic motor pump system. When the piston reaches its maximum level of retraction and the pressure of the fluid increases to a predefined value, a pressure differential sensor closes the motor intake valve and activates the fluid outlet valve, allowing the discharge of fluid towards the preceding chamber. When a maximum level of extension is reached by the piston, a sensor of extension stops is activated and closes the motor outlet valve, and opens the motor intake valve, allowing the filling of the motor cylinder again.

Safety discharge valve VDS: this valve is actuated only if the pressure differential sensor actuates between the chamber and the preceding chamber and senses a pressure difference which can deform the chamber in a manner which is of an important enough level. A thin rod is located inside of the chamber in such a way that one end is fixed on the chamber's wall whereas the other end controls the valve, which is fixed to the chamber, and only if the deformation of the chamber is of an important enough level the VDS will work.

Simple retention valves VRS and VR: these are valves that allow the fluid to flow only in one direction. A simple retention valve is arranged at the fluid intake port of the pumping assembly of the elemental hydraulic motor pump system, at the pumping assembly's fluid unloading port and at the fluid admission or intake port to the chamber. It operates in such a way that it never allows more pressure in the chamber that is more external to the chamber than in the chamber itself.

Elemental hydraulic motor pumps: it is comprised of two cylinder-piston assemblies that form a motor or propelling assembly and a pumping assembly, wherein the pistons and cylinders are operatively joined in such a way that when one piston moves in its cylinder in one direction relative to its disposition in the cylinder, the other piston also has to move in its cylinder in the same relative direction. There is an elemental hydraulic motor pump system in each chamber.

External cylinder rod: this is a rod which is mounted on one end to the elemental hydraulic motor pump's pumping cylinder and has piston extension stops on the other end, wherein a sensing device detects when the motor piston reaches one of these stops to open the motor intake valve VIMI and close the motor outlet valves VEM.

Double Concentric Chambers

The multichamber pressure increasing device described requires dismantling the chambers to mount inside the parts or material to be manufacture or test at ultra high pressure. A version of the invention which does not need dismantling the whole pressure-increasing system to open the same and mount inside parts to manufacture or test at ultra high pressure, is one with door means to load said parts in the innermost chamber but better still if it is a device with double chambers. In this respect, a spherical multichamber compartment is disposed which does not need to have any pressure-increasing arrangement comprised of an elemental hydraulic motor-pump systems, valves, sensors, etc., mounted therein, since it is in fluid communication with a cylindrical multichamber compartment which does have such a pressure increasing system. In this way, the spherical multichamber compartment is only used to place inside (in the innermost chamber) the objects to be compressed at high pressure. See FIG. 5.

It can be observed that a spherical multichamber having the same diameters as those of a cylindrical multichamber have much more resistance. Or else for a same pressure they allow a much larger internal diameter which enables those objects or samples of larger size to be placed inside.

Figure 5:
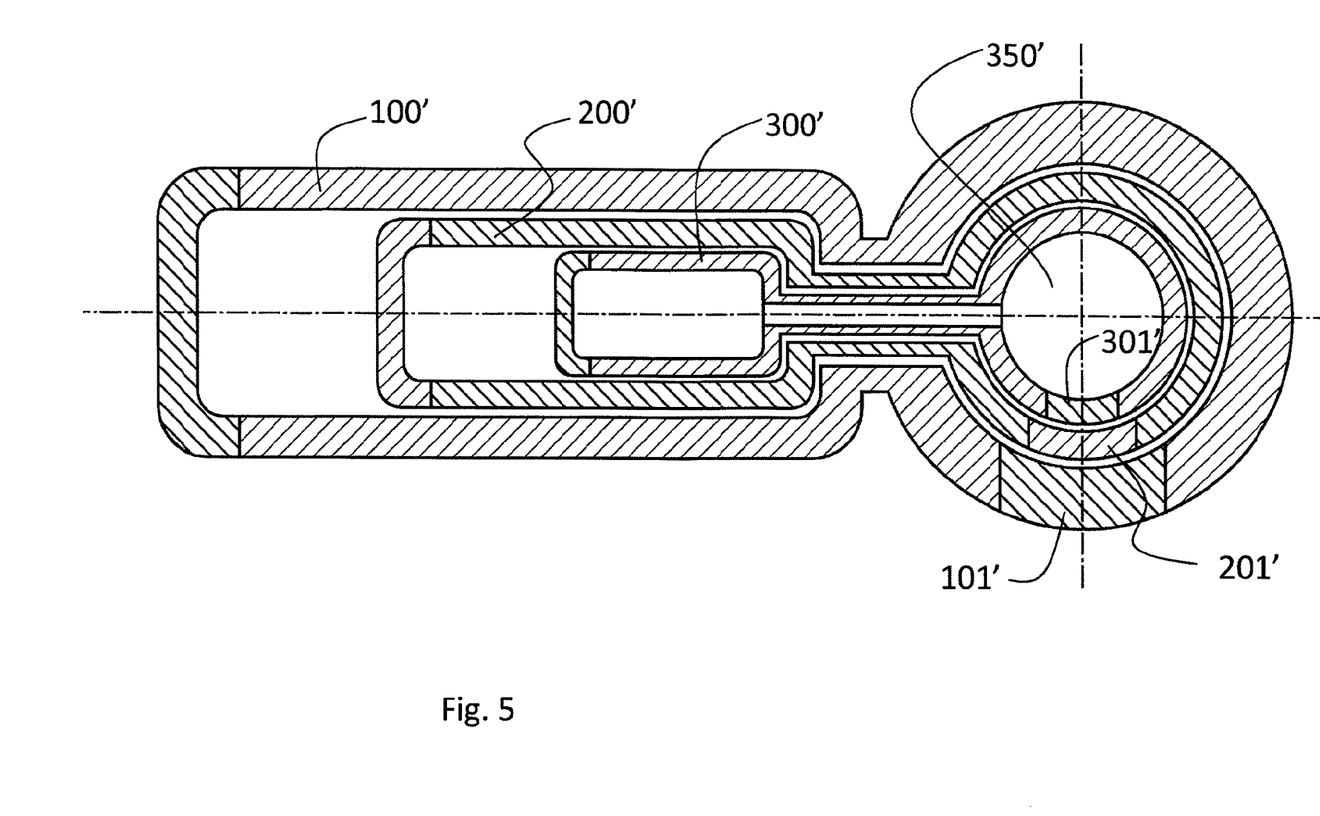
FIG. 5 schematically shows a lengthwise cross-section of a multichamber pressure increasing device according to the invention with each chamber having a double compartment, wherein one of the compartments is directed to contain therein the elemental hydraulic motor pump systems, whereas the other one is intended to install therein components to be tested or formed at high pressure in the innermost chamber, the latter compartment being spherical and having no gaps between the chambers.

FIG. 5 shows a multichamber device with a double compartment, where one is directed to contain the pressure increasing arrangement and the other one is directed to contain objects to be compressed. It shall be noted that the compartment where the objects are contained is preferentially spherical and does not have spaces (gaps) between the chambers.

I claim:

1. A multichamber pressure-increasing device, for producing ultra-high pressures within a defined volume through an iterative process, the multichamber device comprising:
    a plurality of chambers disposed in series one inside the other, from a first, outermost chamber to a last, innermost chamber wherein the innermost chamber is configured in such a way that objects or samples are placed therein to subject them to said ultra-high pressures, wherein the outermost chamber is connected to an external hydraulic pump designed to pump a fluid into the outermost chamber, wherein the chambers are so interconnected therebetween that pressurized fluid can pass from a preceding chamber to a succeeding chamber within the preceding chamber, and vice versa; and
    a plurality of elemental hydraulic motor pump systems mounted in a corresponding one of the plurality of chambers, each elemental hydraulic motor pump system consisting of two cylinder-piston assemblies that form a motor part and a pumping part of the elemental hydraulic motor pump system, wherein the motor part consists of a motor cylinder and a motor piston, and the pumping part consists of a pumping cylinder and a pumping piston; wherein the two cylinder-piston assemblies are operatively joined together in such a way that the pumping piston extends or retracts within the pumping cylinder simultaneously with the motor piston extending or retracting within the motor cylinder, whereby the motor part actuates the pumping part in such a way as to: a) let in pressurized fluid from within said any chamber to the pumping part and fill the pumping cylinder with said fluid at the same time that pressurized fluid at the same pressure flows into the motor part cylinder; and b) subsequently enable said fluid in the pumping part cylinder to be compressed therein and impelled at a higher pressure into the succeeding chamber at the same time that the fluid in the motor part cylinder is discharged to the preceding chamber or, if said any chamber is the outermost chamber, to the environment at nil pressure outside of the device.

2. The multichamber pressure-increasing device of claim 1, wherein the motor and pumping parts of the elemental hydraulic motor pump systems each comprise a fluid outlet port and a fluid intake port, and wherein the multichamber pressure-increasing device further comprises, in each chamber:
    a fluid incoming tube connecting the pumping part of the elemental hydraulic motor pump system of the preceding chamber with the motor part of the succeeding chamber;
    a motor intake valve at the fluid intake port of the motor part of each elemental hydraulic motor pump system, which has an open position which lets in the fluid from the fluid incoming tube directly into the motor part of the elemental hydraulic motor pump system and a closed position which instead deviates the fluid from the fluid incoming tube to the inside of the chamber;
    a motor outlet valve at the fluid outlet port of the motor part of each elemental hydraulic motor pump system;
    a pressure differential sensor in each chamber operable to actuate the motor intake valve and the motor outlet valve of the elemental hydraulic motor pump system in the chamber in a way as to close the motor intake valve when the pressure in the chamber is below or equal to a predefined value Pi, or else to open the motor intake valve when the pressure in the chamber exceeds said predefined value Pi so that fluid can flow into the motor part and fill the motor cylinder;
    a motor piston extension sensor in each chamber operable to open or close the motor outlet valve of the elemental hydraulic motor pump system when the motor piston has respectively reached a minimum and a maximum level of extension; and
    two retention valves in each chamber, one of which is located at the fluid intake port of the pumping part of the elemental hydraulic motor pump system and the other is located at the fluid outlet port of the pumping part of the elemental hydraulic motor pump system.

3. The multichamber pressure-increasing device of claim 1, wherein the motor and pumping parts of the elemental hydraulic motor pump systems each comprise a fluid outlet port and a fluid intake port, and wherein the multichamber pressure-increasing device further comprises:
    a fluid intake port of the chamber, in each chamber, connected to the pumping part of the elemental hydraulic motor pump system of the preceding chamber;
    a motor intake valve at the fluid intake port of the motor part of each elemental hydraulic motor pump system;
    a motor outlet valve at the fluid outlet port of the motor part of each elemental hydraulic motor pump system;
    a pressure differential sensor in each chamber operable to actuate the motor intake valve and the motor outlet valve of the elemental hydraulic motor pump system in the chamber in a way as to close the motor intake valve and open the motor outlet valve when the pressure difference between the chamber and the one preceding it exceeds a predefined value;

a spring precompressed between the cylinder of the motor part and the cylinder of the pumping part of each elemental hydraulic motor pump system, the spring capable of extending the cylinders by the restoring force of the spring towards its natural position and thereby filling the motor and pumping parts of the elemental hydraulic motor pump system in each chamber with fluid from said chamber when the motor intake valve is open and the motor outlet valve is closed;

a sensor that senses when each motor piston in the corresponding chamber reaches a stop, wherein the sensor is operable to open the motor intake valve of the elemental hydraulic motor pump system and to close the motor outlet valve of the elemental hydraulic motor pump system when the motor piston reaches a maximum level of extension, the stops disposed on an external cylinder rod mounted on one end to the pumping cylinder of the elemental hydraulic motor pump system; and retention valves arranged in each chamber at the fluid intake port of the chamber, the fluid intake port of the pumping part of the elemental hydraulic motor pump system and the fluid outlet port of the pumping part of the elemental hydraulic motor pump system.

4. The multichamber pressure increasing device of claim 1, wherein the motor cylinder is rigidly joined to the pumping piston, and the pumping cylinder is rigidly joined to the motor piston.

5. The multichamber pressure-increasing device of claim 1, wherein the multichamber device comprises double-compartment chambers where one compartment is cylindrical and the other compartment is spherical in a way that the elemental hydraulic motor pump systems are placed in the cylindrical compartment, while the objects or samples to be submitted to the ultra-high pressures are disposed inside the sperical compartment of the innermost double-compartment chamber.

6. An arrangement for increasing pressure from a first enclosed chamber full of pressurized fluid to a second chamber which is disposed inside the first chamber, the arrangement comprising an elemental hydraulic motor pump system mounted in the first chamber and consisting of two cylinder-piston assemblies that form a motor part and a pumping part of the elemental hydraulic motor pump system, wherein the two cylinder-piston assemblies are operatively joined together in such a way that both pistons extend or retract simultaneously within the respective cylinders, whereby the motor part actuates the pumping part in such a way as to: a) let in pressurized fluid from within the first chamber to the pumping part and fill the pumping cylinder with said fluid at the same time that fluid at the same pressure flows into the motor part cylinder; and b) subsequently enable the fluid in the pumping part cylinder to be compressed therein and impelled at a higher pressure into the second chamber at the same time that the fluid in the motor part cylinder is discharged to a lower pressure environment outside of the first chamber.

* * * * *

UNITED STATES PATENT AND TRADEMARK OFFICE
CERTIFICATE OF CORRECTION

PATENT NO.         : 9,022,750 B2
APPLICATION NO.    : 13/729699
DATED              : May 5, 2015
INVENTOR(S)        : Mauricio Eduardo Mulet Martinez Page 1 of 1

It is certified that error appears in the above-identified patent and that said Letters Patent is hereby corrected as shown below:

Title page add:

--(30) FOREIGN APPLICATION PRIORITY DATA

Nov. 29, 2005 (CL)..........3107-2005
   Nov. 29, 2005 (CL)..........3108-2005
   Sep. 6, 2006 (CL)..........2331-2006--.

Claims

Claim 5, column 16, line 7, delete "sperical". Insert --spherical--.

Signed and Sealed this
Nineteenth Day of April, 2016

Michelle K. Lee
*Director of the United States Patent and Trademark Office*